US009943099B2

(12) United States Patent
Fields

(10) Patent No.: US 9,943,099 B2
(45) Date of Patent: Apr. 17, 2018

(54) JUICER ARRANGEMENTS

(71) Applicant: Kenwood Limited, Havant, Hampshire (GB)

(72) Inventor: Robert Fields, Havant (GB)

(73) Assignee: KENWOOD LIMITED, Hampshire (GB)

( * ) Notice: Subject to any disclaimer, the term of this patent is extended or adjusted under 35 U.S.C. 154(b) by 158 days.

(21) Appl. No.: 14/759,123

(22) PCT Filed: Dec. 23, 2013

(86) PCT No.: PCT/GB2013/053413
§ 371 (c)(1),
(2) Date: Jul. 2, 2015

(87) PCT Pub. No.: WO2014/106737
PCT Pub. Date: Jul. 10, 2014

(65) Prior Publication Data
US 2015/0335059 A1    Nov. 26, 2015

(30) Foreign Application Priority Data
Jan. 4, 2013    (GB) .................................. 1300092.2

(51) Int. Cl.
*A47J 31/00*    (2006.01)
*A23N 1/00*    (2006.01)
(Continued)

(52) U.S. Cl.
CPC ................ *A23N 1/02* (2013.01); *A23B 4/005* (2013.01); *A47J 19/02* (2013.01)

(58) Field of Classification Search
CPC .. A47J 31/00; A47J 19/00–19/06; A23N 1/00; A23N 1/003
(Continued)

(56) References Cited

U.S. PATENT DOCUMENTS 5,771,791 A * 6/1998 Ling .................... A47J 19/027
241/101.2
5,996,633 A * 12/1999 Kato .................... F28D 1/0316
138/116
(Continued)

FOREIGN PATENT DOCUMENTS

CN    101223963    7/2008
CN    2012/05192    3/2009
(Continued)

OTHER PUBLICATIONS

Search Report dated Jun. 14, 2013 from corresponding Great Britain Application No. 1300092.2 (1 page).
(Continued)

*Primary Examiner* — Michael Laflame, Jr.
(74) *Attorney, Agent, or Firm* — Brinks Gilson & Lione; G. Peter Nichols

(57) ABSTRACT

An electrically powered juicer has a treatment module arranged to subject the expressed juice to a pasteurization or UHT process in order to prevent the rapid deterioration in quality of the expressed juice that otherwise occurs. The lifetime of the juice expressed by the juicer is considerably extended, allowing juice to be prepared in larger volumes than previously and thus negating the requirement for juicing on demand. The treatment module includes serially arranged heating means and cooling means, operative while the expressed juice is traversing a meandering pathway, and a thermostatically controlled element sited and configured to ensure that the heating operation is automatically repeated in the event that juice exiting the heating operation has not reached a predetermined temperature required for the pasteurization or UHT process.

16 Claims, 5 Drawing Sheets

(51) Int. Cl.
  *A23N 1/02* (2006.01)
  *A23B 4/005* (2006.01)
  *A47J 19/02* (2006.01)

(58) Field of Classification Search
  USPC ........... 99/447, 495, 501–513; 219/429–430, 219/432–436
  See application file for complete search history.

(56) References Cited

U.S. PATENT DOCUMENTS

| | | | | |
|---|---|---|---|---|
| 6,371,013 | B1* | 4/2002 | Chen | A47J 19/022 |
| | | | | 99/501 |
| 8,056,764 | B2* | 11/2011 | Paasch | A47J 47/01 |
| | | | | 219/433 |
| 2003/0075057 | A1* | 4/2003 | Saunders | A47J 19/02 |
| | | | | 99/495 |
| 2007/0074860 | A1* | 4/2007 | Shinhama | F28D 1/05375 |
| | | | | 165/173 |
| 2007/0169640 | A1* | 7/2007 | Sato | A47J 31/36 |
| | | | | 99/495 |
| 2012/0201943 | A1* | 8/2012 | Schlor | A23B 7/005 |
| | | | | 426/489 |

FOREIGN PATENT DOCUMENTS

| | | |
|---|---|---|
| DE | 10 2009 006672 | 6/1990 |
| DE | 2012 005549 U1 | 11/2012 |
| JP | H02 163066 | 6/1990 |
| WO | WO 02/34059 | 5/2002 |
| WO | WO 2009/089763 | 7/2009 |

OTHER PUBLICATIONS

PCT/GB2013/053413 International Search Report dated Feb. 21, 2014 (2 pages).

* cited by examiner

JUICER ARRANGEMENTS

This application claims priority to International Application No. PCT/GB2013/053413 filed Dec. 23, 2013 and to Great Britain Application No. 1300092.2 filed Jan. 4, 2013; the entire contents of each are incorporated herein by reference.

This invention relates to electric juicers, by which is meant electrically powered appliances usable to express juice from fruits and vegetables. It relates especially, though not exclusively, to juicers for use in domestic kitchens, and it relates to all kinds of electrically powered juicers, such as centrifugal juicers, citrus press juicers utilising ribbed, conical reamers and so-called cold-press juicers utilising vertically mounted screws.

With the present and on-going interest in healthy nourishment, electric juicers of all kinds have become popular and, in general, they work quite well. However, existing juicers of all kinds share a chronic difficulty in that, because the quality of the expressed juice deteriorates quite rapidly, it is necessary to express relatively small amounts at a time. There is thus, in effect, a limitation to juicing on demand, which carries with it the need to set up, use and clean out the juicer each time juice is required. Centrifugal juicers suffer particularly in this respect, since the juicing operation employed in such appliances exacerbates the deterioration process, by incorporating significant amounts of air into the juice.

The invention aims to address the above-mentioned difficulty and accordingly provides a juicing arrangement comprising an electrically powered juicing appliance arranged to express juice from fruits and/or vegetables, and treatment means incorporated into the appliance and including a heating arrangement for heating the juice to a predetermined temperature for a selected duration thereby to subject the juice to a pasteurisation or UHT process.

By this means, the lifetime of the juice is considerably extended, subject to proper storage conditions being met, so that juice can be prepared in larger volumes than previously, thus negating the requirement for juicing on demand. This naturally reduces the work necessary to set up, operate and clean out the juicer by cutting down on the number of juicing operations needed to prepare a given quantity of juice.

Moreover, the invention enables a user to produce treated juice for immediate consumption and/or for storage.

Typically, the electrically powered appliance comprises any of: a centrifugal juicer, a citrus press-type of juicer utilising a ribbed, conical reamer, or a cold-press juicer utilising a vertically mounted pressing screw.

In some preferred embodiments of the invention, said treatment means comprises a module securable to and removable from said appliance; said module having means to receive expressed juice from said appliance.

In such embodiments, it is preferred that said module is formed with a meandering tubular pathway for said expressed juice; part at least of said pathway passing adjacent a heating means supported by said appliance.

It is further preferred that a further part of said pathway passes adjacent a cooling means supported by said appliance, and that said first-mentioned and further parts of said pathway are arranged in series, with said juice passing said heating means before passing said cooling means.

In particularly preferred embodiments of the invention, the treatment means further comprises temperature sensing means for sensing the temperature of said juice as it passes said heating means and a diverter valve controlled by the temperature sensing means for routing the juice back to the start of said pathway if the sensed temperature is insufficient to achieve the treatment.

In order to facilitate cleaning of said pathway, it is preferable that said module comprises first and second juxtaposed plate members, and that each plate member is formed with an open half-tubular portion of said meandering pathway and adapted such that the plate members are separable.

Preferably, the treatment means comprises active means to drive said fluid through said pathway, and said active means is driven by a driver means supported by the appliance.

Typically, said heating arrangement includes any of: thermoelectric heating means incorporating at least one Peltier chip; resistive wire elements; infrared radiators; thick film elements or combinations thereof.

Typically, said cooling means (where provided) comprises any of: thermoelectric cooling means incorporating at least one Peltier chip; a vapor-compression device; a vapor absorption cycle device; a separate water cooling system; a heat exchanger, or an evaporation system or combinations thereof.

In order that the invention may be clearly understood and readily carried into effect, one embodiment thereof will now be described, by way of example only, with reference to the accompanying drawings, of which:

Figures 6A, 6B:
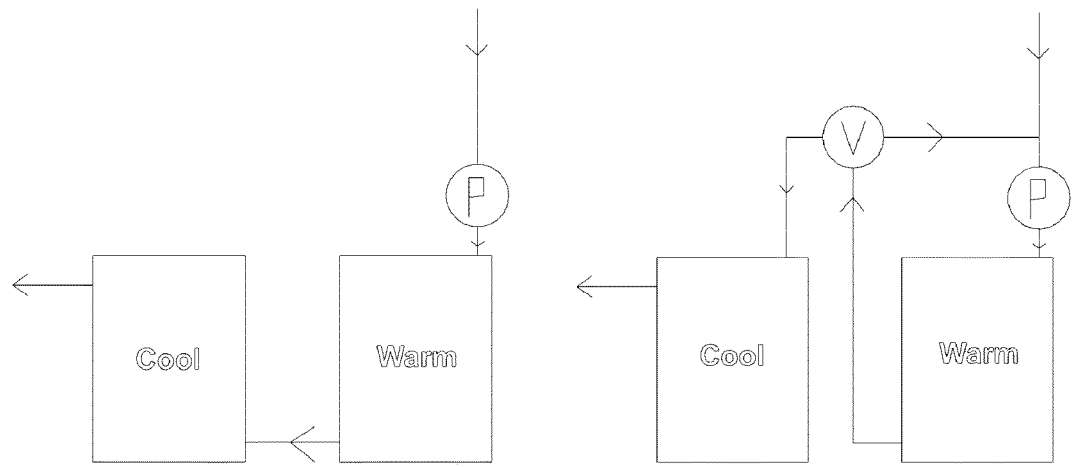
Figure 6C:
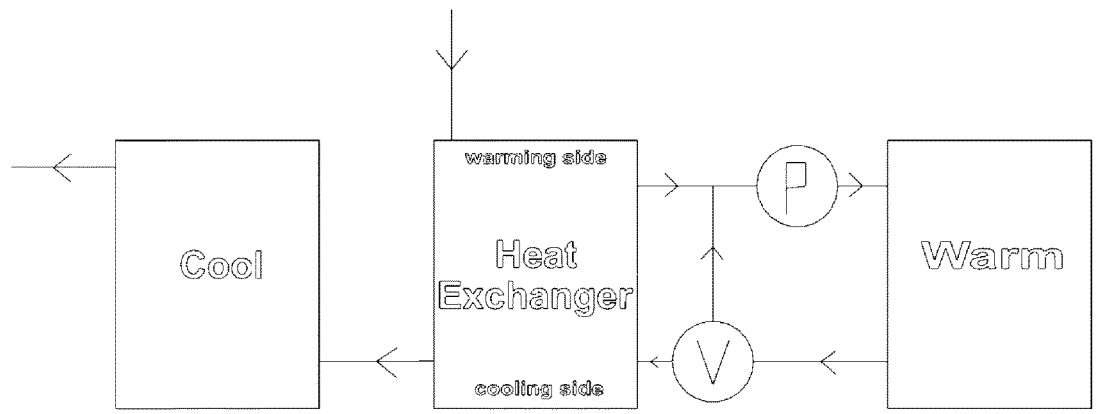

FIGS. 6(a), 6(b) and 6(c) show schematic juice-flow diagrams indicative of flow arrangements of differing complexity.

Figure 1:
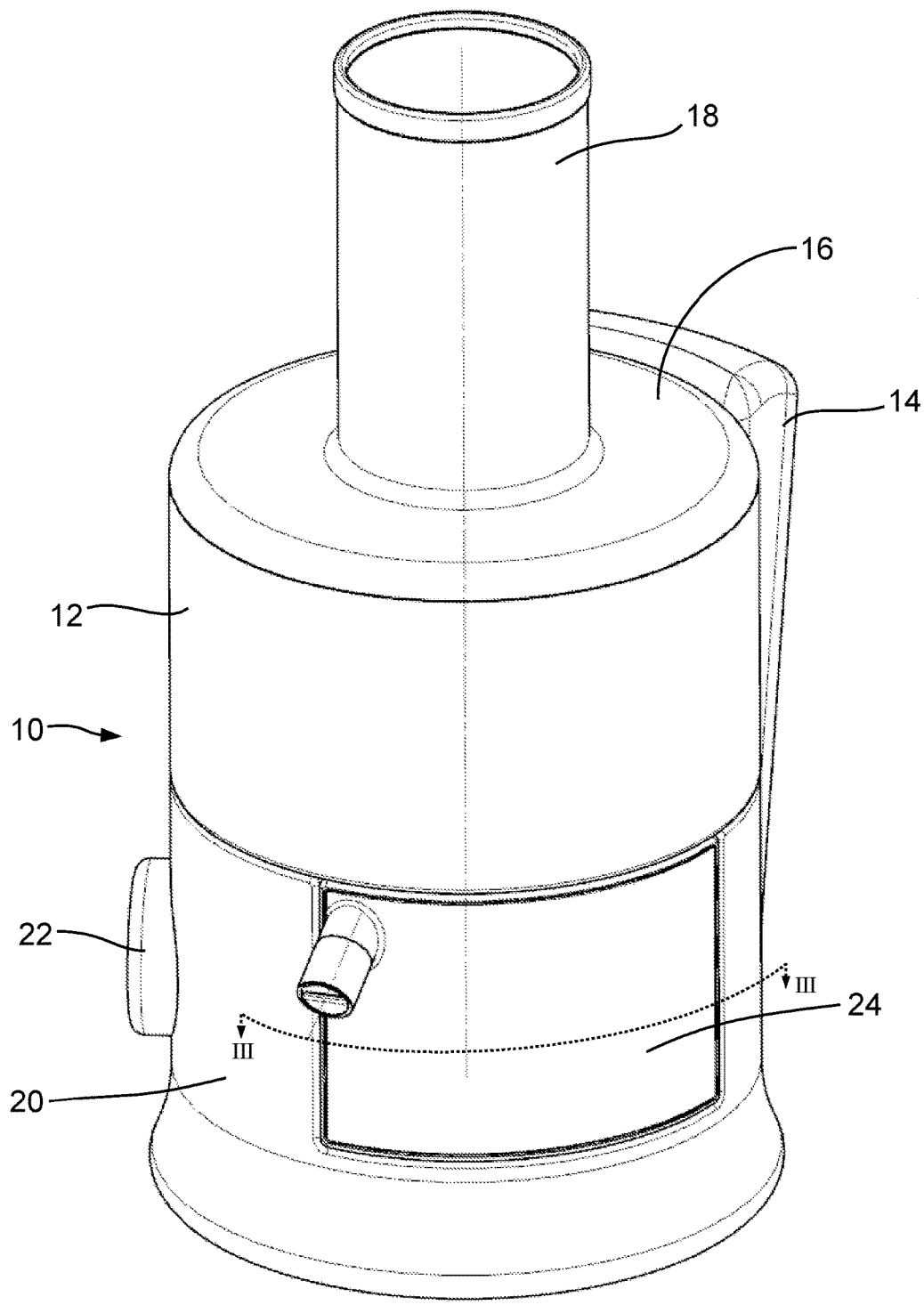
FIG. 1 shows a general isometric external view of a juicing arrangement according to one example of the invention; showing a treatment module in place.

FIG. 1 shows external features of a juicing arrangement in accordance with one embodiment of the invention.

In this example, the arrangement is incorporated into an electrically powered juicing appliance comprising a centrifugal juicer 10 having a main howl part 12 defining a generally cylindrical working space within which a macerating device, such as a discoidal cutter plate, is rotated at a reasonably high speed to pulp the fruits or vegetables being juiced. Typically, the cutter plate incorporates, or is located near, the base of a frusto-conical filter member the side wall which is pierced, or otherwise formed, with small holes and/or narrow slits, thus being sufficiently porous to permit juice to pass therethrough. The cutter plate, and usually also the filter member, are spun sufficiently rapidly to separate the juice from pulp residues, comprising mainly fibrous bulk matter. The juice passes through the apertures in the side wall for collection and dispensing whilst the pulp residues are blocked by the filter member and generally thrown upwardly and outwardly therefrom into a pulp-collection chamber 14.

The main bowl part 12 is capped by a lid 16, through the top of which passes a feed-chute 18 designed to receive and accommodate produce to be juiced, and a pusher (not shown) is provided whereby the produce can be urged through the feed-chute 18 and into abrasive contact with the cutter plate.

An electric motor used to spin the macerating plate, and usually also the filter member, rapidly within the working space is housed in a main body, or base housing 20, which also supports, in conventional fashion, controls and actuators such as 22 for the motor and ancillary electronics.

In this example of the invention, the main body part 20 is configured to house a juice treatment unit 24 which is set up to subject juice expressed from the input produce by the centrifugal juicer 10 to a pasteurisation process. As previously mentioned, however, the treatment unit 24 could be set up, if preferred, to implement a UHT process. In any event, the expressed and treated juice is dispensed from the appliance by way of an outlet spout 26 which can advantageously be provided with an anti-dripping mechanism such as that described in WO 2010/128274 A.

Figure 2:
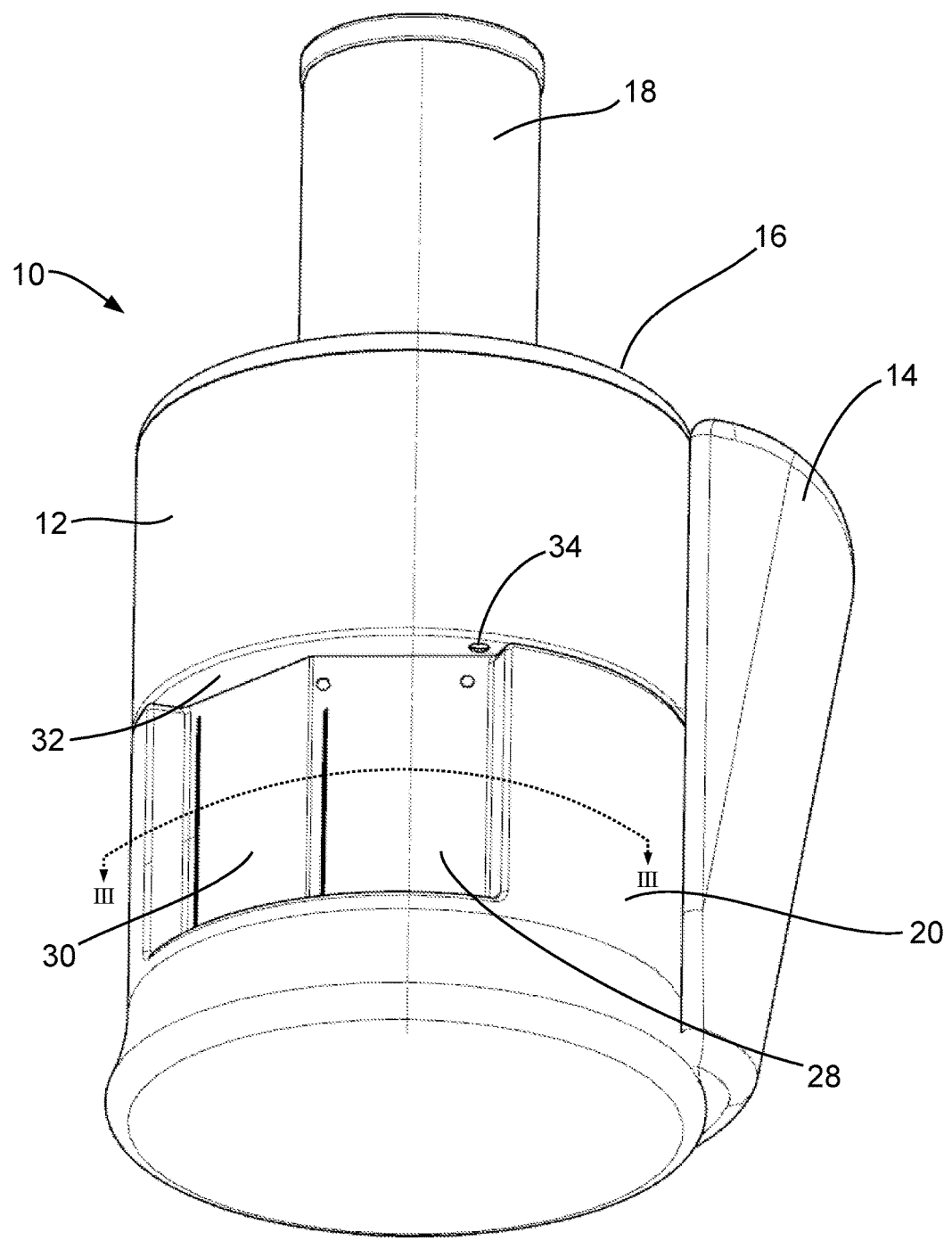
FIG. 2 is similar to FIG. 1, but shows the arrangement from a different angle and with the treatment module removed.

FIG. 2 shows another view of the juicer shown in FIG. 1, but with the juice treatment unit 24 removed, leaving visible the external surface of a heating pad 28 and showing the location of an adjacent cooling means 30. It is desirable for the treatment unit 24 to be removable for cleaning, as will be described in more detail later, and so, in this example, the main body of the appliance 10 is formed with a recess 32 dimensioned and configured to receive and accommodate the unit 24 as a plug-in module, and to retain the unit 24 securely in place during use. Visible at the top of the recess 32 is an aperture 34 which is the exit hole through which juice expressed by the juicer 10 exits the juicer proper and enters the treatment unit 24.

Figure 3:
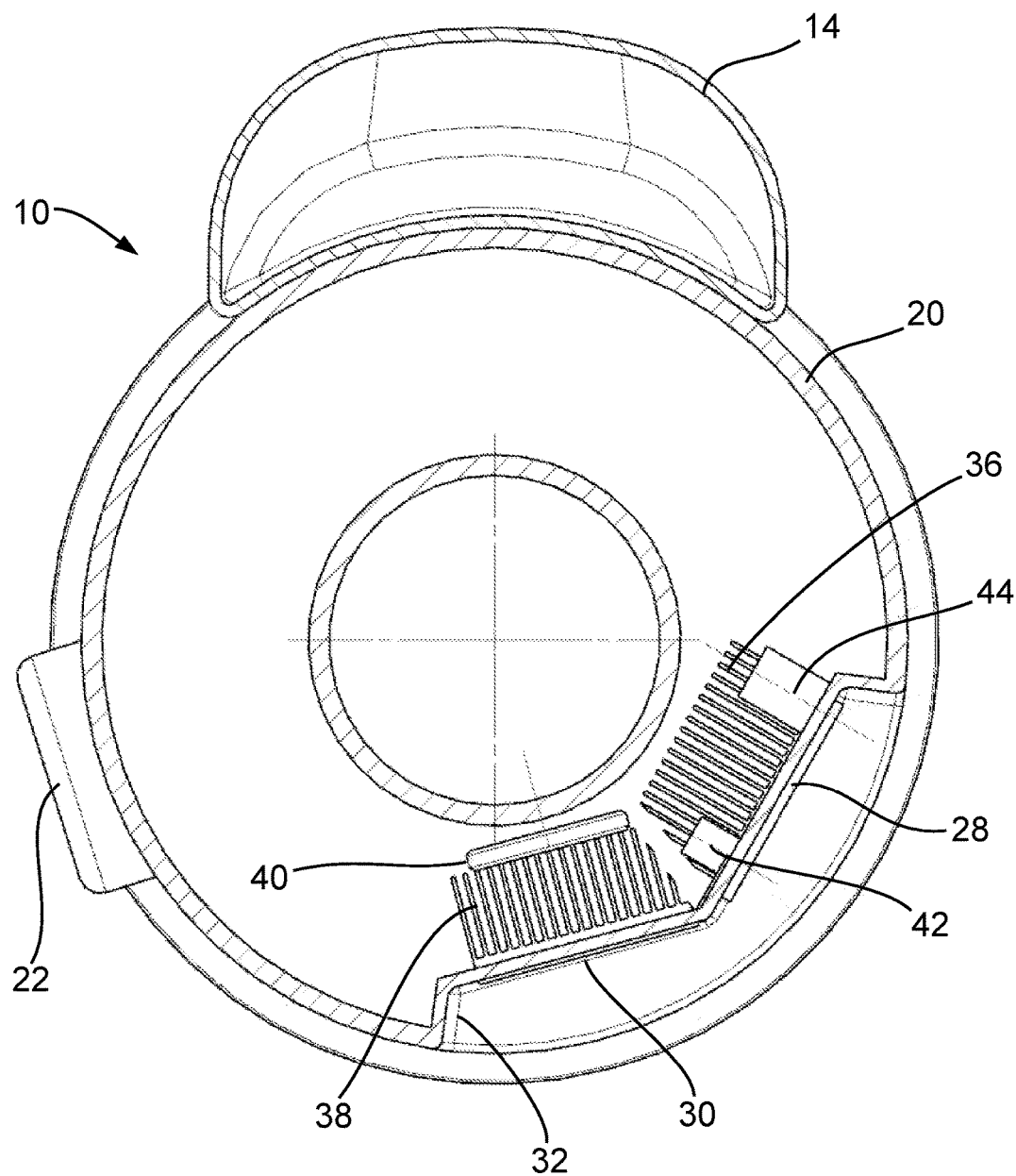
FIG. 3 shows a cross-sectional view taken on the line III-III shown in FIGS. 1 and 2.

FIG. 3 shows a cross-section through the juicer 10 at about the level of the dashed line III marked in FIGS. 1 and 2. Here it can be seen that the recess 32 in the main body part 20 presents outwardly lacing surfaces of the heating pad 28 and the cooling means 30. In the present example, the heating and cooling agencies are chosen to comprise thermoelectric heating and refrigeration units incorporating respective Peltier chips (not specifically shown) though the heating and cooling agencies can, ii preferred, take any or a number of alternative forms such as (for heating): resistive wire elements, infrared radiators, thick film elements etc. and (for cooling): vapor-compression devices, vapor absorption cycle devices, separate water cooling systems, heat exchangers, or evaporation systems.

In some instances, moreover, combinations of different heating and/or cooling techniques can be used for either agency.

Both the heating pad 28 and cooling means 30 can be powered by any electrical source, such as mains electricity (240/110 volt), battery power, solar power, super capacitors etc., or both or either can utilise endothermic or exothermic chemical reactions.

In this example, respective heat sinks 36, 38 are associated with the heater 28 and the cooler 30, and at least the heat sink 38 is provided with forced cooling air by way of a fan 40. Also visible in FIG. 3 are a valve driver 42 and a motor drive unit 44, both of which interact with respective components of the treatment unit 24 in a manner now to be described.

Figure 4:
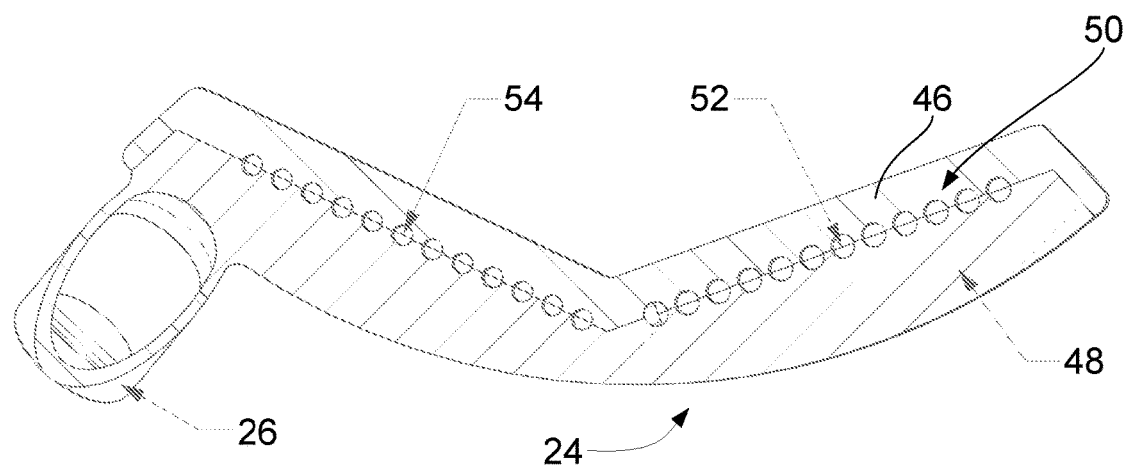
FIG. 4 shows a cross-section through a treatment module.
Figure 5:
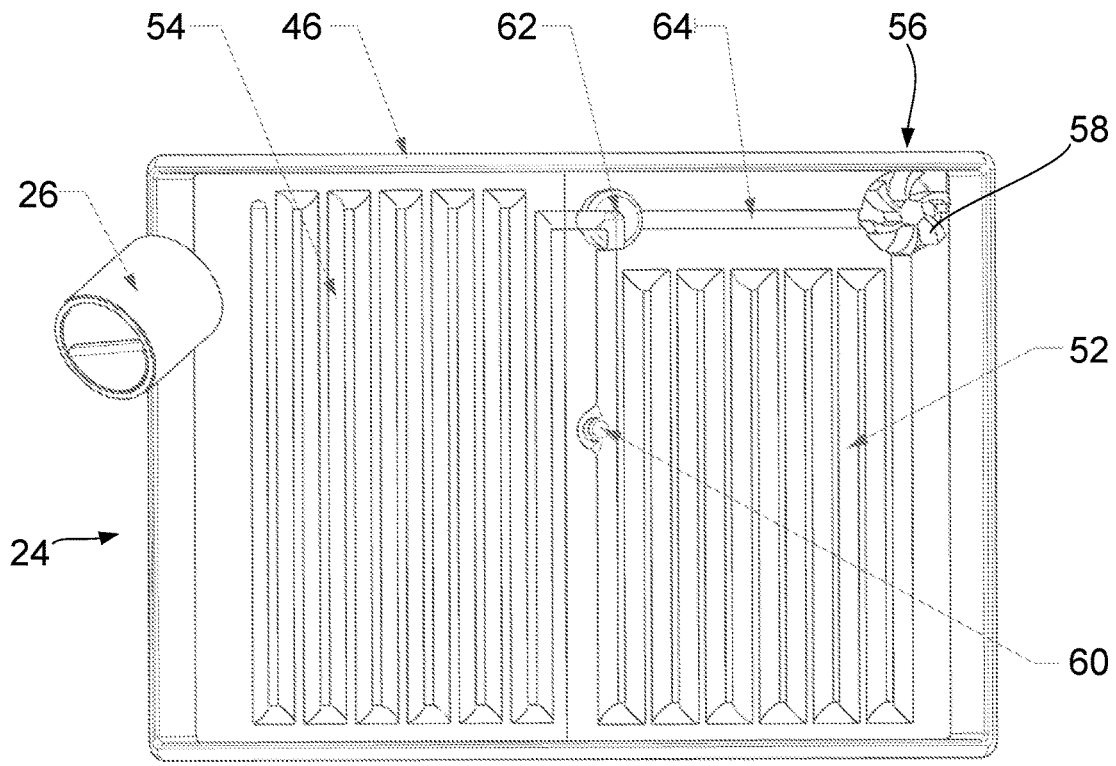
FIG. 5 shows the treatment module in front elevation.

Referring now to FIGS. 4 and 5, these show the treatment unit 24 in cross-section and from front elevation respectively.

In this example, the unit 24 comprises a module which is made of two main parts, comprising a back plate 46 and a front plate 48. These two parts are separable to allow access to their internal components for cleaning, and they may thus be completely separate from one another, or joined together by a hinge or other articulation method so that they can be opened out. These two parts may be made from any suitable material.

Moulded or otherwise incorporated into both the back plate 46 and the front plate 48 are a series of open channel parts which, when the plates 46 and 48 are assembled together to form the unit 24, combine to form a meandering set of closed fluid channels 50 through which the expressed juice is constrained to flow. In this example, the channels 50 comprise a heated channel set 52 and a cooled channel set 54 linked together in series. The plates 46 and 48 are fitted with sealing components, such as gaskets, and moreover the channels 50 may optionally incorporate hydrophilic or hydrophobic coatings or materials to ease cleaning.

The fluid travels from a fluid entry hole, at location 56 (aligning with the outlet hole 34 at the top of recess 32 in the appliance 10) into the heated channel set 52 via a pump comprising an impeller 58 which is driven by the aforementioned driver unit 44. Located towards the end of the meandering path formed by the heated channel set 52, there is a temperature sensor 60, which is followed by a diverter valve 62 arranged so that, if the fluid temperature, as sensed by the temperature sensor 60 is not at the specified level, the fluid is diverted back to the beginning of the heated channel set 52, via a bypass channel 64. If, on the other hand, the temperature sensor 60 determines that the fluid temperature has reached an acceptable level, the valve 62 is conditioned to divert the fluid into the cooled channel set 54 and finally through the outlet spout 26 into a receptacle or additional storage chamber.

The pump 44, 58 can be of any known type such as diaphragm, rotary vane or impeller, and can be operated by any means or power source. In the shown example, the impeller 58 is driven directly by a shaft (not shown) from the motor drive unit 44 inside the main body 20 of the juicer 10. This configuration requires no motor on the pasteurisation unit 24, which can thus be removed from the appliance 10 and placed in a dishwasher, or otherwise cleaned. The pump can be mounted anywhere in the fluid path and more than one pump can be used if needed. A filter (not shown) may optionally be provided at any convenient location to prevent solid parts of the fruit from entering or travelling through the fluid transfer channels.

The diverter valve 62 can be of any known type and can be operated by any convenient means or power source. In the present example the valve 62 is operated directly by a shaft (not shown) that interfaces with the valve drive unit 42 inside the main body 20 of the juicer 10. As with the impeller drive mentioned previously, this configuration is advantageous in requiring no active drive components on the pasteurisation unit 24, so enabling it to be removed from the appliance 10 and cleaned, in a dishwasher or otherwise. If desired, the valve 62 can be operated by a bimetallic strip or other heat activated material that is designed to undergo a physical change at the required temperature.

The temperature sensor 60 can also be supported within the main body 20 of the juicer 10 and disposed so as to contact the fluid inside the pasteurisation unit 24 via a rubber membrane or a thin wall section in the back plate 46. Moreover, there may be more than one temperature sensor in the fluid path.

As the pasteurisation unit 24 is configured as a module which is removable and can be opened to allow cleaning, possibly in a dishwasher, and as the juice moves directly from the working space in the main howl part 12 into the pasteurisation unit 24, there are minimal additional components to clean and there is no requirement to wash through any pipes in the actual main body 20 of the juicer 10. This is a significant benefit associated with the use of the present invention.

Referring now to the flow diagrams shown in FIG. 6, it will be appreciated that various options are available for defining the route to be taken by the expressed fluid through the pasteurisation unit 24. The route just described, utilising a diverter valve arrangement, is represented in FIG. 6(b). A simpler option, shown in FIG. 6(a), does not employ a temperature sensor or diverter valve, and a more complex option, shown in FIG. 6(c) incorporates a heat exchanger and thus exhibits improved energy efficiency. In any of the options, a separate holding chamber or channel may be provided between the heating and cooling chambers to hold the warm fluid for a chosen length of time before cooling.

The currently preferred treatment process is pasteurisation, but UHT treatment can be used instead if preferred. To ensure complete pasteurisation, the fluid must be heated to roughly 70 degrees centigrade for a period not less than 15 seconds. To ensure complete UHT sterilisation the fluid must be heated to roughly 135 degrees centigrade for a period not less than 0.5 seconds, though these times and temperatures can vary for different foods or fluids. The temperatures and times employed by the unit 24 can thus be user defined, preset by the manufacturer or automatically controlled in response to sensed parameters.

The output temperature of the fluid at the outlet 26 can likewise be preset, user adjustable or automatically adjusted in relation to the ambient temperature via an external temperature sensor. All of the temperature sensors, motors, and valves can be monitored and controlled by a microcontroller which can vary the flow rate of the fluid via the pump speed, the temperature of the fluid at different stages with both the heating and cooling elements 28, 30 and the direction the fluid takes via the position of the valve 62.

In some embodiments of the invention, the juicing appliance comprises, in combination, a juicer, such as a centrifugal juicer, and a dedicated carafe or other vessel directly associated with the juicer and configured to receive juice directly expressed from the juicer.

In some such embodiments, a treatment means of the form described above is incorporated into the carafe or other vessel, instead of being incorporated into the juicer. One example of such an embodiment of the invention provides a matched juicer and carafe mounted on a common base which is connectable to mains electricity and from which the juicer picks up its operating power and the carafe or other vessel picks up power to operate the treatment means.

The invention claimed is:

1. A juicing arrangement comprising an electrically powered juicing appliance arranged to express juice from fruits and/or vegetables, a treatment module incorporated into the appliance that includes a heater to heat the juice to a predetermined temperature for a selected duration to subject the juice to pasteurization or ultra-high temperature ("UHT") process, an inlet located upstream of the heater, and an outlet separate from the inlet and located downstream of the heater to output the juice after treatment.

2. The juicing arrangement according to claim 1, wherein the electrically powered appliance comprises one of: a centrifugal juicer, a citrus press-type of juicer utilizing a ribbed, conical reamer, or a cold-press juicer utilizing a vertically mounted pressing screw arranged to express the juice.

3. The juicing arrangement according to claim 1, wherein the treatment module is securable to and removable from the appliance and is configured to receive expressed juice from the appliance.

4. The juicing arrangement according to claim 3, wherein the treatment module is formed with a meandering tubular pathway for the expressed juice, wherein at least part of the pathway passing adjacent the heating arrangement supported by the appliance.

5. The juicing arrangement according to claim 4, wherein a further part of the pathway passes adjacent a cooler supported by the appliance.

6. The juicing arrangement according to claim 5, wherein the at least part of the pathway passing adjacent the heater and the further part of the pathway are arranged in series, with the juice passing the heater before passing the cooler.

7. The juicing arrangement according to claim 6, further comprising a temperature sensor for sensing the temperature of the juice as it passes the heater and a diverter valve controlled by the temperature sensor for routing the juice back to a start of the pathway if the sensed temperature is below a specified temperature.

8. The juicing arrangement according to claim 4, wherein the treatment module comprises first and second juxtaposed plate members and wherein each plate member is formed with an open half-tubular portion of the meandering pathway and adapted such that the plate members are separable to permit cleaning of the pathway.

9. The juicing arrangement according to claim 4, wherein the treatment module comprises a pump to drive the fluid through the pathway.

10. The juicing arrangement according to claim 9, wherein the pump is driven by a motor supported by the appliance.

11. The juicing arrangement according to claim 1, wherein the heater includes any of at least one Peltier chip; resistive wire elements; infrared radiators; thick film elements, or combinations thereof.

12. The juicing arrangement according to claim 5, wherein the cooler comprises any of at least one Peltier chip; a vapor-compression device; a vapor absorption cycle device; a separate water cooling system; a heat exchanger; an evaporation system; or combinations thereof.

13. The juicing arrangement according to claim 1, wherein the appliance comprises, in combination, a juicer and a dedicated carafe or other vessel directly associated with the juicer and configured to receive juice directly expressed from the juicer.

14. The juicing arrangement according to claim 13, wherein the treatment module is incorporated into the carafe or other vessel.

15. The juicing arrangement according to claim 14, wherein the juicer and the carafe or other vessel are mounted on a common base, connectable to an electrical source, from which the juicer picks up its operating power and from which the carafe or other vessel picks up power to operate the treatment module.

16. A juicing arrangement comprising:
an electrically powered juicing appliance arranged to express juice from a food source; and
a treatment module securable to and removable from the appliance and configured to receive expressed juice from the appliance, wherein the treatment module is formed with a meandering tubular pathway for the expressed juice such that at least part of the pathway passes adjacent a heater supported by the appliance and a further part of the pathway passes adjacent a cooler supported by the appliance.

* * * * *